(12) United States Patent
Alvarez et al.

(10) Patent No.: US 12,494,135 B2
(45) Date of Patent: Dec. 9, 2025

(54) AUTOMATED ENVIRONMENT FOR AERONAUTICAL INFORMATION SERVICES

(71) Applicant: THE BOEING COMPANY, Arlington, VA (US)

(72) Inventors: Pablo Costas Alvarez, Majadahonda (ES); Milind Vasudeo Naik, Frankfurt (DE)

(73) Assignee: THE BOEING COMPANY, Arlington, VA (US)

( * ) Notice: Subject to any disclaimer, the term of this patent is extended or adjusted under 35 U.S.C. 154(b) by 273 days.

(21) Appl. No.: 18/465,436

(22) Filed: Sep. 12, 2023

(65) Prior Publication Data

US 2024/0119847 A1 Apr. 11, 2024

(30) Foreign Application Priority Data

Oct. 10, 2022 (EP) ..................................... 22382957

(51) Int. Cl.
| | |
|---|---|
| G08G 5/00 | (2025.01) |
| G06F 16/25 | (2019.01) |
| G08G 5/20 | (2025.01) |
| G08G 5/34 | (2025.01) |
| G08G 5/50 | (2025.01) |
| G08G 5/55 | (2025.01) |

(52) U.S. Cl.
CPC ............ *G08G 5/50* (2025.01); *G06F 16/258* (2019.01); *G08G 5/20* (2025.01); *G08G 5/34* (2025.01); *G08G 5/55* (2025.01)

(58) Field of Classification Search
CPC .......... G08G 5/0047; G08G 5/20; G08G 5/34; G08G 5/50; G08G 5/55; G06F 16/258

USPC .............................................. 701/3
See application file for complete search history.

(56) References Cited

U.S. PATENT DOCUMENTS

| | | | | |
|---|---|---|---|---|
| 8,543,581 B2 * | 9/2013 | Martin | ..................... | G06F 16/23 707/748 |
| 9,424,756 B2 * | 8/2016 | Gaertner | ................... | G08G 5/34 |
| 9,690,834 B2 * | 6/2017 | Chandra | ............... | G06F 16/258 |

(Continued)

FOREIGN PATENT DOCUMENTS

WO 2011036499 A1 3/2011

OTHER PUBLICATIONS

"ACID", Wikipedia, http://www.aixm.aero/sites/aixm.aero/files/imce/AIXM51HTML/index.html [CSP] CodeSynthesis http://www.codesynthesis.com/products/, downloaded Aug. 29, 2023, pp. 1-6.

(Continued)

*Primary Examiner* — Andrew Joseph Rudy
(74) *Attorney, Agent, or Firm* — Moore IP Law

(57) ABSTRACT

An automated environment for aeronautical information services includes converting a first data set from a first data structure to a common data structure, automatically creating a common database based at least on the common data structure, converting a second data set from a second data structure to the common data structure, analyzing a difference between the first converted data set and the second converted data set to determine a relevance metric, and, if the relevance metric meets a relevance threshold, storing at least a portion of the second converted data set at a filtered database, the filtered database separate from the common database, wherein the portion is associated with the difference.

20 Claims, 4 Drawing Sheets

(56) References Cited

U.S. PATENT DOCUMENTS

| | | | | |
|---|---|---|---|---|
| 9,793,978 | B2* | 10/2017 | Wang | G01S 5/0027 |
| 11,334,235 | B2* | 5/2022 | Plantinga | G08G 5/21 |
| 2023/0267840 | A1* | 8/2023 | Costas | G08G 5/56 701/3 |

OTHER PUBLICATIONS

"AIXM Model—HTML Documentation—Home," Aeronautical Information Exchange Model 5.1, http://www.aixm.aero/sites/aixm.aero/files/imce/AIXM51/aixm_feature_identification_and_referen ce-1.0.pdf, downloaded Aug. 29, 2023, pp. 1-2.

"Isolation," Wikipedia, https://en.wikipedia.org/wiki/Isolation_(database_systems)#Isolation_levels, downloaded Aug. 29, 2023, pp. 1-3.

"Java Architecture for XML Binding," https://docs.oracle.com/javase/8/docs/technotes/guides/XML/jaxb/index.html [JPA] Java SpecificationRequest 317: Java™ Persistence 2.0 https://jcp.org/en/jsr/detail?id=317, downloaded Aug. 29, 2023, p. 1.

"Use of Geography Markup Language (GML) for Aviation Data," Open Geospatial Consortium, Mar. 3, 2016, https://portal.opengeospatial.org/files/?artifact_id=62061, p. 1-129.

AIXM 5 Temporality Model, http://www.aixm.aero/sites/aixm.aero/files/imce/AIXM51/aixm_temporality_1.0.pdf, downloaded Aug. 29, 2023, pp. 1-32.

Christensen, Jack, "Materialized View Strategies Using PostgreSQL," Apr. 23, 2015 , https://hashrocket.com/blog/posts/materialized-view-strategies-using-postgresql [MYSQL] MySQL https://www.mysql.com/why-mysql/, pp. 1-18.

Extended European Search Report for application No. 22382957.3 dated Apr. 21, 2023, pp. 1-10.

Fowler, Martin, "Schemaless Data Structures" Thought Works, Jan. 7, 2013, https://martinfowler.com/articles/schemaless/ [GML] Ogc Gepgraphy Markup Language http://www.opengeospatial.org/standards/gml, p. 1.

PostGIS Dev Manual , Chapter 4, Using PostGIS: Data Management and Queries, https://postgis.net/docs/using_postgis_dbmanagement.html#PostGIS_Geography [PGSQL] PostgreSQL https://www.postgresql.org/about/, downloaded Aug. 29, 2023, pp. 1-31.

* cited by examiner

AUTOMATED ENVIRONMENT FOR AERONAUTICAL INFORMATION SERVICES

CROSS REFERENCE TO RELATED APPLICATIONS

The subject disclosure claims priority to European Patent Application No. 22382957.3, filed Oct. 10, 2022, entitled "Automated Environment for Aeronautical Information Services," the entire contents of which are herein incorporated by reference.

FIELD OF THE DISCLOSURE

The subject disclosure is generally related to an automated environment for aeronautical information services.

BACKGROUND

Automation is increasingly important to providing, analyzing, and consuming aeronautical information services. As part of that increased automation, countries around the world publish flight navigation data in Aeronautical Information Publications ("AIP") on a regular basis. Data is generally published on a 28-day interval known as an "ARIAC cycle," but many exceptions exist. Often data must be gathered from a large number (e.g., more than 200) different information sources. Currently, different countries publish their AIP in different electronic formats that are intended to be human-readable rather than machine-readable (e.g., portable document format, comma-separated values, Microsoft Word, paper-based publications, etc.). In order to ingest, analyze, and distribute this information, information providers can employ hundreds of human data analysts in order to effectively load and integrate the AIP data.

Recent regulations have begun to allow service providers to publish AIP data exclusively in machine-readable formats and are no longer required to publish AIP data in human-readable formats. In order to effectively automate these machine-readable formats, changes and improvements to automation environments will need to be made to support the machine-readable formats, enable user interfaces to make data human readable, and help support staff to both understand and query data.

SUMMARY

In a particular implementation, a method includes receiving a first plurality of aeronautical information data sets from a plurality of aeronautical information data providers, the first plurality of aeronautical information data sets including a first data set in a first data structure. The method also includes generating a common data structure configured to store the first plurality of aeronautical information data sets. The method also includes converting the first data set from the first data structure to the common data structure to generate a first converted data set. The method also includes automatically creating a common database based at least on the common data structure. The method also includes storing the first converted data set at the common database. The method also includes receiving a second plurality of aeronautical information data sets from the plurality of aeronautical information data providers, the second plurality of aeronautical information data sets including a second data set in a second data structure. The method also includes converting the second data set from the second data structure to the common data structure to generate a second converted data set. The method also includes storing the second converted data set at the common database. The method also includes identifying a difference between the first converted data set and the second converted data set. The method also includes analyzing the difference to determine a relevance metric. The method also includes, if the relevance metric meets a relevance threshold, storing at least a portion of the second converted data set at a filtered database, the filtered database separate from the common database, wherein the portion is associated with the difference.

In another particular embodiment, a non-transient, computer-readable medium stores instructions that, when executed by one or more processors, cause the one or more processors to initiate, perform, or control operations including receiving a first plurality of aeronautical information data sets from a plurality of aeronautical information data providers, the first plurality of aeronautical information data sets including a first data set in a first data structure. The operations also include generating a common data structure configured to store the first plurality of aeronautical information data sets. The operations also include converting the first data set from the first data structure to the common data structure to generate a first converted data set. The operations also include automatically creating a common database based at least on the common data structure. The operations also include storing the first converted data set at the common database. The operations also include receiving a second plurality of aeronautical information data sets from the plurality of aeronautical information data providers, the second plurality of aeronautical information data sets including a second data set in a second data structure. The operations also include converting the second data set from the second data structure to the common data structure to generate a second converted data set. The operations also include storing the second converted data set at the common database. The operations also include identifying a difference between the first converted data set and the second converted data set. The operations also include analyzing the difference to determine a relevance metric. The operations also include, if the relevance metric meets a relevance threshold, storing at least a portion of the second converted data set at a filtered database, the filtered database separate from the common database, wherein the portion is associated with the difference.

In another particular embodiment, a device includes means for receiving a first plurality of aeronautical information data sets from a plurality of aeronautical information data providers, the first plurality of aeronautical information data sets including a first data set in a first data structure. The device also includes means for generating a common data structure configured to store the first plurality of aeronautical information data sets. The device also includes means for converting the first data set from the first data structure to the common data structure to generate a first converted data set. The device also includes means for automatically creating a common database based at least on the common data structure. The device also includes means for storing the first converted data set at the common database. The device also includes means for receiving a second plurality of aeronautical information data sets from the plurality of aeronautical information data providers, the second plurality of aeronautical information data sets including a second data set in a second data structure. The device also includes means for converting the second data set from the second data structure to the common data structure to generate a second converted data set. The device also includes means for storing the second converted data set at the common database. The device also includes means for identifying a difference between the first converted data set and the second converted data set. The device also includes means for analyzing the difference to determine a relevance metric. The device also includes means for storing at least a portion of the second converted data set at a filtered database if the relevance metric meets a relevance threshold, the filtered database separate from the common database, wherein the portion is associated with the difference.

In another particular implementation, a system includes a memory configured to store instructions and one or more processors configured to receive a first plurality of aeronautical information data sets from a plurality of aeronautical information data providers, the first plurality of aeronautical information data sets including a first data set in a first data structure. The one or more processors are also configured to generate a common data structure configured to store the first plurality of aeronautical information data sets. The one or more processors are also configured to convert the first data set from the first data structure to the common data structure to generate a first converted data set. The one or more processors are also configured to automatically create a common database based at least on the common data structure. The one or more processors are also configured to store the first converted data set at the common database. The one or more processors are also configured to receive a second plurality of aeronautical information data sets from the plurality of aeronautical information data providers, the second plurality of aeronautical information data sets including a second data set in a second data structure. The one or more processors are also configured to convert the second data set from the second data structure to the common data structure to generate a second converted data set. The one or more processors are also configured to store the second converted data set at the common database. The one or more processors are also configured to identify a difference between the first converted data set and the second converted data set. The one or more processors are also configured to analyze the difference to determine a relevance metric. The one or more processors are also configured to, if the relevance metric meets a relevance threshold, store at least a portion of the second converted data set at a filtered database, the filtered database separate from the common database, wherein the portion is associated with the difference.

The features, functions, and advantages described herein can be achieved independently in various implementations or can be combined in yet other implementations, further details of which can be found with reference to the following description and drawings.

DETAILED DESCRIPTION

Figure 1:
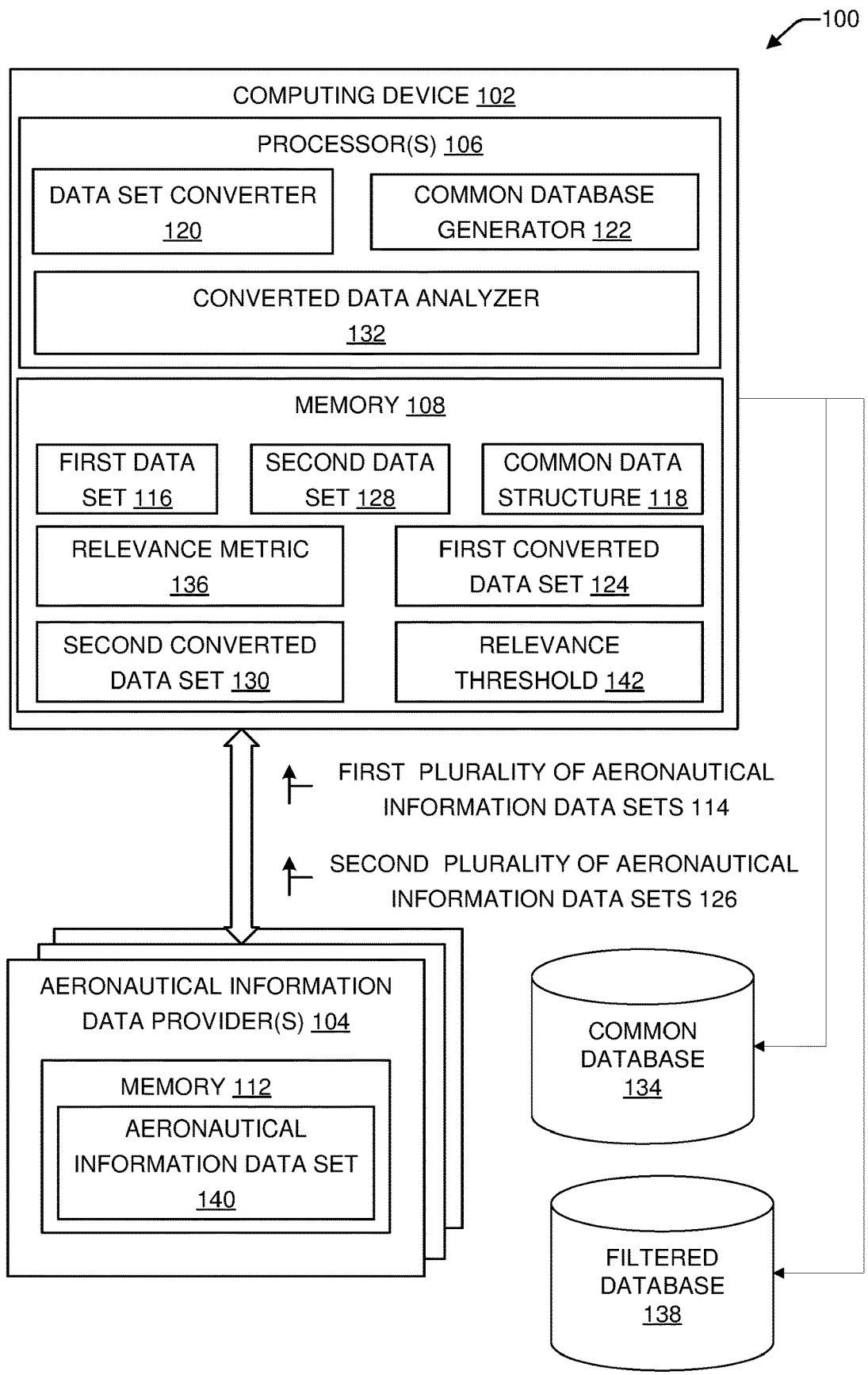
FIG. 1 depicts an example system for automating an environment for aeronautical information services, in accordance with at least one implementation of the subject disclosure.

In order to meet the requirements of an increasingly automated environment of Aeronautical Information Services ("AIS"), the provision of paper products and messages is being migrated to the collection and provision of digital data. AIS data flows are increasingly complex, can constitute interconnected systems, and can involve many actors (including multiple suppliers and consumers). There is also a growing need in the global aviation systems for high data quality and for cost efficiency.

One particular model for handling increasingly complex data flows is the Aeronautical Information Exchange Model ("AIXM"). AIXM is a model that describes the entities and relationships for aeronautical features (e.g., airports, designated points, runways, airspaces, volumes, navaids, terminal procedures, etc.). AIXM describes Extensible Markup Language ("XML") messages and features used to exchange information about the aeronautical data. Other particular models include the Flight Information Exchange Model ("FIXM"), the International Civil Aviation Organization's Meteorological Information Exchange model known as IWXXM, etc. Although particular aspects of the subject disclosure can be described and/or illustrated with respect to a particular model (e.g., AIXM), one or ordinary skill in the art would understand the present disclosure to apply to similar data exchange models without departing from the scope of the subject disclosure.

Although AIXM and similar models can standardize data flow to some extent, often different AIS data providers have implemented different models (e.g., AIXM vs. FIXM), different versions of the same model (e.g., AIXM 1.0 vs. AIXM 2.0), etc. Further, a single version of AIXM and/or similar models can have relatively high complexity, particularly in terms of geometry management, feature definition, relationship between features, temporality management, XML schema implementation(s), complex rules, validation, data volume, etc. This relatively high complexity can make it difficult for an organization to consume and/or analyze AIS from different data providers.

The systems and methods described herein facilitate and improve computerized automation for an organization receiving a plurality of aeronautical information data sets from different data providers. For example, rather than relying on a specific implementation based on AIXM datasets offered by known providers, the systems and methods disclosed herein use an AIXM logical data model that can be implemented as an XML schema to create—without human intervention—a generic, provider-agnostic AIXM model that is persisted into a database. Such an approach fully supports all possible AIXM features and all geometry information (embedded or linked). Further, the model allows for the information in the database to be easily displayed to an end-user. Still further, in some aspects, spatial features can be represented in the database using standardized data extensions, as described further below. This can include, in a particular aspect, storing representation of spatial data as values, which are available to convert, compare, and process this data in various ways.

The figures and the following description illustrate specific exemplary embodiments. It will be appreciated that those skilled in the art will be able to devise various arrangements that, although not explicitly described or shown herein, embody the principles described herein and are included within the scope of the claims that follow this description. Furthermore, any examples described herein are intended to aid in understanding the principles of the disclosure and are to be construed as being without limitation. As a result, this disclosure is not limited to the specific embodiments or examples described below, but by the claims and their equivalents.

Particular implementations are described herein with reference to the drawings. In the description, common features are designated by common reference numbers throughout the drawings. As used herein, various terminology is used for the purpose of describing particular implementations only and is not intended to be limiting. For example, the singular forms "a," "an," and "the" are intended to include the plural forms as well, unless the context clearly indicates otherwise. Further, some features described herein are singular in some implementations and plural in other implementations. To illustrate, FIG. 1 depicts a system 100 including one or more processors ("processor(s)" 106 in FIG. 1), which indicates that in some implementations the system 100 includes a single processor 106 and in other implementations the system 100 includes multiple processors 106. For ease of reference herein, such features are generally introduced as "one or more" features and are subsequently referred to in the singular unless aspects related to multiple of the features are being described.

The terms "comprise," "comprises," and "comprising" are used interchangeably with "include," "includes," or "including." Additionally, the term "wherein" is used interchangeably with the term "where." As used herein, "exemplary" indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

As used herein, "generating," "calculating," "using," "selecting," "accessing," and "determining" are interchangeable unless context indicates otherwise. For example, "generating," "calculating," or "determining" a parameter (or a signal) can refer to actively generating, calculating, or determining the parameter (or the signal) or can refer to using, selecting, or accessing the parameter (or signal) that is already generated, such as by another component or device. As used herein, "coupled" can include "communicatively coupled," "electrically coupled," or "physically coupled," and can also (or alternatively) include any combinations thereof. Two devices (or components) can be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled can be included in the same device or in different devices and can be connected via electronics, one or more connectors, or inductive coupling, as illustrative, non-limiting examples. In some implementations, two devices (or components) that are communicatively coupled, such as in electrical communication, can send and receive electrical signals (digital signals or analog signals) directly or indirectly, such as via one or more wires, buses, networks, etc. As used herein, "directly coupled" is used to describe two devices that are coupled (e.g., communicatively coupled, electrically coupled, or physically coupled) without intervening components.

FIG. 1 depicts an example system 100 for automating an environment for aeronautical information services, in accordance with at least one implementation of the subject disclosure. In some implementations, the system 100 includes a computing device 102 configured to communicate with one or more aeronautical information data providers 104, a common database 134, and a filtered database 138.

In some implementations, the aeronautical information data provider(s) 104 can include a memory 112. The memory 112 can have stored thereon a variety of data and data types including, for example one or more aeronautical information data sets 140. In some aspects, the aeronautical information data set 140 can include one or more data values associated with the AIS data gathered, calculated, analyzed, generated, and/or otherwise stored by the aeronautical information data provider(s) 104. In a particular aspect, the aeronautical information data set 140 can include a superset of information from which is gathered, calculated, analyzed, gathered, and/or otherwise derived aeronautical information for communication to the computing device 102.

The aeronautical information data providers(s) 104 can be configured to communicate a first plurality of aeronautical information data sets 114 and a second plurality of aeronautical information data sets 126 to the computing device 102. In some implementations, the first plurality of aeronautical information data sets 114 can be communicated by a first aeronautical information data provider (of the aeronautical information data provider(s) 104), while the second plurality of aeronautical information data sets 126 can be communicated by a second aeronautical information data provider (of the aeronautical information data provider(s) 104). In the same or alternative implementations, the first and second plurality of aeronautical information data sets 114, 126 can be communicated by the same aeronautical information data provider 104. For example, the aeronautical information data provider 104 can communicate the first plurality of aeronautical information data sets 114 at a first time and the second plurality of aeronautical information data sets 126 at a second time. As another example, the aeronautical information data provider 104 can communicate the first and second plurality of aeronautical information data sets 114, 126 at substantially the same time, where the first plurality of aeronautical information data sets 114 includes a different set of data than the second plurality of aeronautical information data sets 126.

Accordingly, the first plurality of aeronautical information data sets 114 can include at least a first data set in a first data structure, while the second plurality of aeronautical information data sets 126 can include at least a second data set in a second data structure. In some aspects, the first data structure and the second data structure can be the same data structure (or different instances of a substantially identical data structure). In the same or alternative aspects, the first data structure and the second data structure can be different.

For example, the first data structure can include data associated with an AIXM implementation, while the second data structure can include data associated with an FIXM implementation. As an additional example, the first data structure can include data associated with a first implementation of AIXM, while the second data structure can include data associated with a second implementation of AIXM. As a further example, the first data structure is associated with data from a first aeronautical information data provider of the plurality of aeronautical information data providers 104, while the second data structure is associated with data from a second aeronautical information data provider of the plurality of aeronautical information data providers 104. As a yet further example, the first data structure can include a first XML schema, the second data structure can include a second XML schema, and the first XML schema can be different from the second XML schema.

In some implementations, the computing device 102 can include one or more processors 106 coupled to a memory 108. The processor(s) 106 are configured to receive at least the first plurality of aeronautical information data sets 114 the second plurality of aeronautical information data sets 126 from the aeronautical information data providers 104. In some aspects, data associated with the first data set of the first plurality of aeronautical information data sets 114 can be stored at the memory 108 (e.g., as the first data set 116). In the same or alternative aspects, data associated with the second data set of the second plurality of aeronautical information data sets 126 can be stored at the memory 108 (e.g., as the second data set 128).

In some aspects, the first data set 116 can include navigation data. In a particular aspect, the navigation data includes runway closure information, airport identification information, runway identification information, terminal identification information, procedural information, holding pattern information, or airway information.

In the same or alternative aspects, the first data set 116 is associated with a first data reporting time period, the second data set 128 is associated with a second data reporting time period, and the first and second data reporting time periods are different. For example, a first aeronautical information data provider of the plurality of aeronautical information data providers can report aeronautical information data on a monthly basis, while a second aeronautical information data provider of the plurality of aeronautical information data providers can report aeronautical information data on a weekly basis.

In some implementations, the processor(s) 106 can also be configured to generate a common data structure configured to store the first plurality of aeronautical information data sets 114. In some aspects, the processor(s) 106 can include one or more modules such as a common database generator 122 configured to perform this operation. In the same or alternative aspects, data associated with the common data structure can be stored at the memory 108 (e.g., as the common data structure 118).

In some implementations, the processor(s) 106 can also be configured to convert the first data set 116 from the first data structure to the common data structure 118 to generate a first converted data set. In some aspects, the processor(s) 106 can include one or more modules such as a data set converter 120 configured to perform this operation. In the same or alternative aspects, data associated with the first converted data set can be stored at the memory 108 (e.g., as the first converted data set 124). In some implementations, the processor(s) 106 can also be configured to store the first converted data set 124 at a common database 134.

In some aspects, converting the first data set 116 from the first data structure to the common data structure 118 can include mapping the first data set 116, associated with a first data reporting time period to a second data reporting time period, as described above. For example, converting the first data set 116 from the first data structure to the common data structure 118 can include mapping the first data set 116, gathered on a daily or weekly basis, to the common data structure, which is structured based on a monthly reporting basis.

In some implementations, the processor(s) 106 can also be configured to automatically create the common database 134 based at least on the common data structure 118. In some aspects, the common database 134 can be a relational database created automatically based at least on the XML schema associated with the first data structure. By dynamically generating the common database 134 based at least on the common data structure 118, the system 100 can efficiently and automatically generate a data structure that is configurable to search data sets quickly and efficiently, as well as to compare two different data sets quickly and efficiently. For example, certain data sets in an AIXM format can be relatively difficult to search and/or to compare with other data sets, even if the other data sets are in the same AIXM format (e.g., a second data set from the same data provider, provided at a later time). Determining whether there have been changes in the data set in the AIXM format can use computing resources (e.g., processing power, memory, etc.) at an inefficient rate compared to the same operations if the data set were in a relational database format. When implementing automation, it can be advantageous for human supervisors to understand the data ingestion and comparison processes within the automated workflow. A relational database can provide a tool to allow human supervisors to analyze the data in a way that can lead to better understanding of the relationships between data entities, geometries, changes from previously ingested data, etc.

In some implementations, the processor(s) 106 can also be configured to convert the second data set from the second data structure to the common data structure 118 to generate a second converted data set. In some aspects, the data set converter 120 can be configured to perform this operation. In the same or alternative aspects, data associated with the second converted data set can be stored at the memory 108 (e.g., as the second converted data set 130). In some implementations, the processor(s) 106 can also be configured to store the second converted data set 130 at the common database 134.

In some implementations, the processor(s) 106 can also be configured to identify a difference between the first converted data set 124 and the second converted data set 130. In some aspects, identifying a difference between the first converted data set 124 and the second converted data set 130 can include identifying new data, identifying changes to existing data, identifying new data fields, identifying changes to existing data fields, identifying missing data, etc. As noted above, an exemplary aspect can include identifying the difference between the first converted data set 124 (where the first converted data set 124 is associated with the first plurality of aeronautical information data sets 114 from a first aeronautical information data provider of the plurality of aeronautical information data providers 104 at a first time) and the second converted data set 130 (where the second converted data set 130 is associated with the second plurality of aeronautical information data sets 126 from the first aeronautical information data provider at a second, later time).

In some implementations, the processor(s) 106 can also be configured to analyze the identified difference between the first converted data set 124 and the second converted data set 130 to determine a relevance metric. In some aspects, the processor(s) 106 can include one or more modules such as a converted data analyzer 132 configured to perform this operation. In the same or alternative aspects, data associated with the relevance metric can be stored at the memory 108 (e.g., as the relevance metric 136).

The system 100 can include a plurality of relevance metrics 136. In some configurations, each relevance metric 136 can be associated with a particular type of change (e.g., new data field, missing data field, change to data field, spelling change, value change, change in data field type, etc.). The processor(s) 106 can be configured to analyze the identified difference between the first converted data set 124 and the second converted data set 130 to determine the relevance metric 136 from among a plurality of relevance metrics.

For example, if aeronautical information data is received from an aeronautical information data provider on a regular basis (e.g., weekly), analyzing a difference between the data set received in week one and the data set received in week two may identify a difference between the two data sets. That difference can fall into one of a variety of categories. For example, the change can be a spelling change in a data field related to a pre-flight procedure, an addition of runway identifiers to an airport runway system, a change of an identifier data field from a numerical value to an alphanumeric value, etc.

In some aspects, the relevance metric 136 can be associated with a predetermined and/or dynamic threshold whereby changes in a data set are determined to be sufficiently relevant to a consumer of aeronautical information data to warrant an update to the aeronautical information data provided to such consumer(s). In a particular aspect, the processor(s) 106 of FIG. 1 can be configured to, if the relevance metric 136 meets a relevance threshold, store at least a portion of the second converted data set 130 at the filtered database 138. Data associated with the relevance threshold can be stored at the memory 108 (e.g., as the relevance threshold 142). In some implementations, the filtered database 138 is separate from the common database 134. In the same or alternative implementations, the portion of the second converted data set 130 stored at the filtered database 138 is associated with the difference identified between the first converted data set 124 and the second converted data set 130.

In operation, the system 100 can be configured to receive aeronautical information data from a plurality of aeronautical information data providers 104 and ingest and process that data that can include data structures associated with new data exchange models that are being developed for air transportation information domains. The new data exchange models can include one or more implementations of AIXM, XML schemas defining AIXM, class representations of the XML schema, etc.

The system 100 can also be configured to build the common database 134 based at least on the common data structure 118 generated to store the first plurality of aeronautical information data sets, convert the first data set 116 to the common data structure 118, convert the second data set 128 to the common data structure 118, identify a difference between the first converted data set 124 and the second converted data set 130, analyze the difference to determine a relevance metric 136, and, if the relevance metric 136 meets the relevance threshold 142, store at least a portion of the second converted data set 130 at the filtered database 138.

As an illustrative example, the system 100 can be configured to receive the first plurality of aeronautical information data sets 114 on a first day and the second plurality of aeronautical information data sets 126 on a second, later day (e.g., the next business day). Extra updates affecting a small fraction of the records in the data sets can happen between the first day and the second day, as other parties publish information about transient changes affecting specific entities (e.g., a temporary closing of a particular runway portion due to weather) Usually updates describe situations that will happen in the near feature, such as scheduled closing of runways for maintenance, etc. By identifying changes from one day to the next (e.g., a runway closure), identifying a particular relevance metric associated with the change (e.g., a runway closure time metric), and whether the relevance meets a relevance threshold (e.g., a runway closure time greater than one hour), the system 100 can identify changes to the aeronautical information that is particularly relevant to the data consumers and/or analysts. The system 100 can also be configured to improve the automation of the data ingestion and analysis by automatically identifying particular analytical points that can require additional human intervention without requiring human analysis of all ingested data.

In some implementations, the system 100 can be further configured to display geo-referenced information and highlight differences with previous data releases, simplifying the workload assigned to human operators. For example, the system 100 can be configured to automatically check that the data ingestion was correct by using automated reverse engineering, reinforcing the trust in the system of the human operators. In a particular aspect, the processor(s) 106 can be configured to convert the first converted data set 124 from the common data structure 118 to the first data structure to generate a first reverse data set. The processor(s) 106 can also be configured to automatically perform a comparison of the first reverse data set with the first data set 116 and generate a conversion error notification if the comparison indicates a discrepancy between the first data set 116 and the first reverse data set. This process can improve the data ingestion automation by determining, post-ingestion, whether there can be a missing data or other data ingestion problem.

The system 100 can also include components not illustrated in FIG. 1. For example, to receive the first and second plurality of aeronautical information data sets 114, 126, the system 100 can also include one or more input/output interfaces, one or more network interfaces, etc. Further, although FIG. 1 illustrates the memory 108 of the system 100 as storing certain data described below, more, fewer, and/or different data can be present within the memory 108 without departing from the scope of the subject disclosure.

Additionally, although FIG. 1 illustrates certain operations occurring within the computing device 102, these operations can be performed by other components of the system 100 without departing from the scope of the subject disclosure. For example, one or more of the plurality of aeronautical information data providers 104 can be configured to host or otherwise incorporate some or all of the common database 134 and/or the filtered database 138.

Further, although FIG. 1 illustrates the computing device 102, the common database 134, and/or the filtered database 138 as separate, other configurations are possible without departing from the scope of the subject disclosure. For example, the computing device 102 and the common database 134 can be integrated into the same electronic device. As an additional example, some or all components of the computing device 102 can be integrated into the same electronic device as some or all components of the common database 134 and/or the filtered database 138. As a further example, one or more components of the computing device 102 and/or one or more components of the common database 134 and/or the filtered database 138 can be distributed across a plurality of computing devices (e.g., a group of servers).

Figure 2:
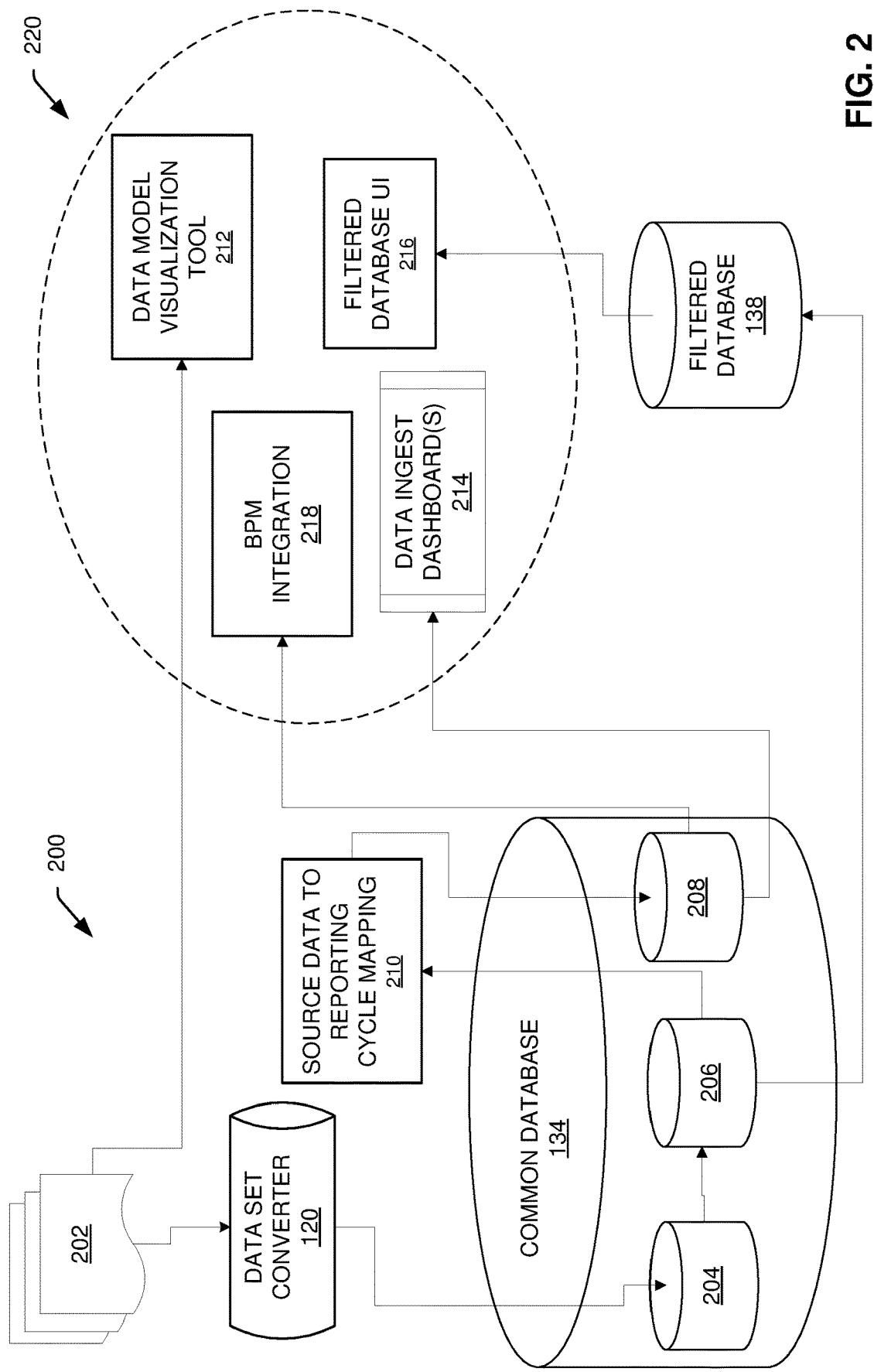
FIG. 2 depicts an example system of an automated environment for aeronautical information services, in accordance with the subject disclosure.

FIG. 2 depicts an example system 200 of an automated environment for aeronautical information services, in accordance with the subject disclosure. Generally, the system 200 corresponds with some or all of the example system 100 of FIG. 1. In some implementations, the system 200 includes a plurality of data sources 202. The data sources 202 can include, in some implementations, one or more data sets of the first plurality of aeronautical information data sets and/or the second plurality of aeronautical information data sets 126 from the plurality of aeronautical information data providers 104, as described in more detail above with reference to FIG. 1.

In some implementations, some or all of the plurality of data sources 202 can be communicated to the data set converter 120. As described in more detail above with reference to FIG. 1, the data set converter 120 can be configured to, among other operations, convert the first data set (e.g., the first data set 116 of FIG. 1) from the first data structure to the common data structure (e.g., the common data structure 118) to generate a first converted data set (e.g., the first converted data set 124). The processor(s) 106 of FIG. 1 can be configured to automatically create the common database 134 and store the first converted data set at the common database 134.

Referring again to FIG. 2, the common database 134 can include, in some implementations, one or more interim data structures 204, 206, 208. In the exemplary system 200, the first interim data structure 204 can include one or more data structure used to temporarily store some or all of the plurality of data sources 202 in the data structure in which they are received. For example, the memory 108 of FIG. 1 can be configured to store the first data set 116 associated with the first plurality of aeronautical information data sets 114. The first data set 116 can be in, for example, an AIXM 5.1 format. The memory 108 can also be configured to store the second data set 128 associated with the second plurality of aeronautical information data sets 126. The second data set 128 can be in, for example, an AIXM 5.2 format.

In the exemplary implementation, the second interim data structure 206 can be configured to store some or all of the data from the first interim data structure 204 as part of a common data structure (e.g., the common data structure 118 of FIG. 1). In some aspects, the second interim data structure 206 can be configured to store some or all of the data from the first interim data structure 204 according to a common data structure that can accommodate the plurality of data sources 202 regardless of their particular data structure. In a particular aspect, the system 200 can be configured to identify different data structures, including data structures associated with different data models, different versions of the same data model, country-specific implementations of a particular data model, provider-specific implementations of a particular data model, etc.

In some implementations, the data set converter 120 can be configured to convert the first data set from the first data structure to the common data structure to generate a first converted data set, as described in more detail above with reference to FIG. 1. In a particular aspect, the data set converter 120 can convert the first data set by using the AIXM logical data model that can be implemented as an XML schema to create, without substantial human intervention, a generic, provider-agnostic AIXM model that is persisted into the common database 134. For example, spatial features can be represented using the International Organization for Standardization ("ISO") and International Electrotechnical Commission ("IEC") standard number 13249 for database and multimedia language. Spatial data, represented as values, can be mapped to the AIXM logical data map. Functions are available to convert, compare, and process this data in various ways.

In some implementation, the second interim data structure 206 can be configured to store a transformed version of each of the plurality of data sources 202. In some aspects, the data stored in the second interim data structure 206 can be generally associated with the data described as stored in the common database 134 in FIG. 1. In the same or alternative aspects, the common database 134 can include additional components configured to perform certain additional operations. For example, referring again to FIG. 2, the common database 134 can include the third interim data structure 208. The third interim data structure 208 can be configured to store data in the common database 134 that has been re-mapped according to a difference between the data reporting time period over which the relevant data was gathered and the data reporting time period over which the common data structure is intended to cover. For example, as described above with reference to FIG. 1, data from a first data source of the plurality of data sources 202 can be gathered over a different reporting time period (e.g., weekly) than data from a second data source of the plurality of data sources 202 (e.g., a second data source gathered monthly). If the common data structure is intended for data capture over a different reporting time period than the data that was received, the received data can be converted to the relevant data reporting time period. For example, the data gathered weekly can be converted to data reflecting a monthly data reporting cycle (e.g., by repeating the weekly data for the number of weeks in a particular month). In a particular aspect, the data mapping can be performed by a source data to reporting cycle mapping module 210. The source data to reporting cycle mapping module 210 can be included, for example, as part of the processor(s) 106 of FIG. 1.

In the illustrative example of FIG. 2, three interim data structures 204, 206, 208 are depicted, although more, fewer, and/or different data structures can be present as part of the common database 134 without departing from the scope of the subject disclosure. For example, the source data to reporting cycle mapping module 210 can be included as part of the data set converter 120. In such a configuration, the second interim data structure 206 and the third interim data structure 208 can be combined into a single interim data structure. As an additional example, the first interim data structure 204 (storing the first converted data set and the second data set) can be configured to be a distinct database from the common database 134.

In some implementations, the system 200 can be further configured to communicate data from the common database 134 to the filtered database 138, as described in more detail above with reference to FIG. 1. In some aspects, data can be communicated from the second interim data structure 206 of the common database 134. For example, the common database 134 can be configured to communicate at least a portion of the second converted data set for storage at the filtered database 138, where the portion of the second converted data set is associated with an identified difference between the first converted data set and the second converted data set as described above.

In a particular aspect, the communication of data for storage at the filtered database 138 can occur simultaneously with an operation of the source data to reporting cycle mapping module 210. In such a configuration, the data can be communicated by the second interim data structure 206 to the third interim data structure 208 and the filtered database 138 at substantially similar times. In an alternative particular aspect, the common database 138 can communicate data to the filtered database 138 after processing by the source data to reporting cycle mapping module 210. In such an aspect, the third interim data structure 208 can be configured to communicate data to the filtered database 138 for storage.

In some implementations, the system 200 can include various components for improving the efficiency of an automated environment for aeronautical information services. For example, the system 200 can include a data model visualization tool 212, one or more data ingest dashboards 214, a filtered database user interface ("UI") 216, one or more business process management ("BPM") integration interfaces 218, and/or other components accessible to a human user of the system 200. One or more of these components can form, individually and/or collectively, a user interface suite 220. Although the user interface suite 220 of the example system 200 illustrates four distinct components, more, fewer, and/or different components can be present without departing from the scope of the present disclosure.

In a particular aspect, the data model visualization tool 212 can include one or more components configured to provide a human user of the system 200 with a means of visualizing data stored according to a particular data model. By providing the user with a visualization tool, the user can more accurately and/or efficiently determine whether data loaded into the system 200 was loaded correctly by, for example, allowing the user to better understand relationships between certain portions of the loaded data (e.g., geographical relationships between certain pieces of navigation data).

In the same or alternative particular aspects, the data ingest dashboards 214 can include one or more components configured to provide a human user of the system 200 with a means of quickly assessing a particular data ingest process. In the illustrative example of FIG. 2, data can be communicated from the common database 134 to the data ingest dashboard(s) 214, where the data is associated with one or more aspects of the ingestion of the plurality of data sources 202 into the common database 134. The data can include, for example, the amount of time taken for ingest, number and type of errors encountered during ingest, number and identity of the data sources 202, etc. By providing this data to the data ingest dashboard(s) 214, the data ingest dashboard(s) 214 can display the information associated with this data in a manner such that a user can more efficiently ascertain the quality of a data load for the common database 134.

In the same or alternative particular aspects, the filtered database 216 of the system 200 can include one or more components configured to provide a human user of the system 200 with a means of quickly assessing the nature and quality of a data update from a previous data load. As described in more detail above with reference to FIG. 1, the filtered database 138 can be populated if a particular relevance metric meets a relevance threshold, where the relevance metric is determined by analyzing a difference between a first converted data set and a second converted data set. By providing a user interface to the filtered database 138, a human user can more efficiently determine the nature and quality of data loaded into the filtered database 138 and thus the nature and quality of data to be updated to consumers of the aeronautical information data sets.

In the same or alternative particular aspects, the BPM integration interface(s) 218 can include one or more components configured to provide increased and/or improved automation and/or business process quality to users of the system 200. For example, the BPM integration interfaces 218 can include one or more interfaces configured to provide data (and/or metadata) associated with the data load of the common database 134 and/or the filtered database 138 to other systems (e.g., a reporting system configured to provide customers with information about upcoming data updates). As an additional example, the BPM integration interfaces 218 can include one or more interface configured to provide data (and/or metadata) associated with the data load of the common database 134 and/or the filtered database 138 to one or more human users of the system 200 designed to allow the human user to perform business functions indirectly related to the data load itself (e.g., database maintenance, telecommunications timing, etc.) more efficiently.

Although FIG. 2 illustrates certain operations occurring within various components of the system 200, these operations can be performed by other components of the system 200 without departing from the scope of the subject disclosure. For example, as noted above the operations performed by the source data to reporting cycle mapping module 210 can be performed by the data set converter 120. As another example, the operation(s) of one or more of the components of the user interface suite 220 can be combined and/or distributed into a plurality of components other than those described herein.

Further, although FIG. 2 illustrates the various components of the system 200 as separate, other configurations are possible without departing from the scope of the subject disclosure. For example, the source data to reporting cycle mapping module 210 can be co-located with the common database 134. As another example, one or more of the components of the user interface suite 220 can be co-located and/or distributed to one or more computing devices.

Figure 3:
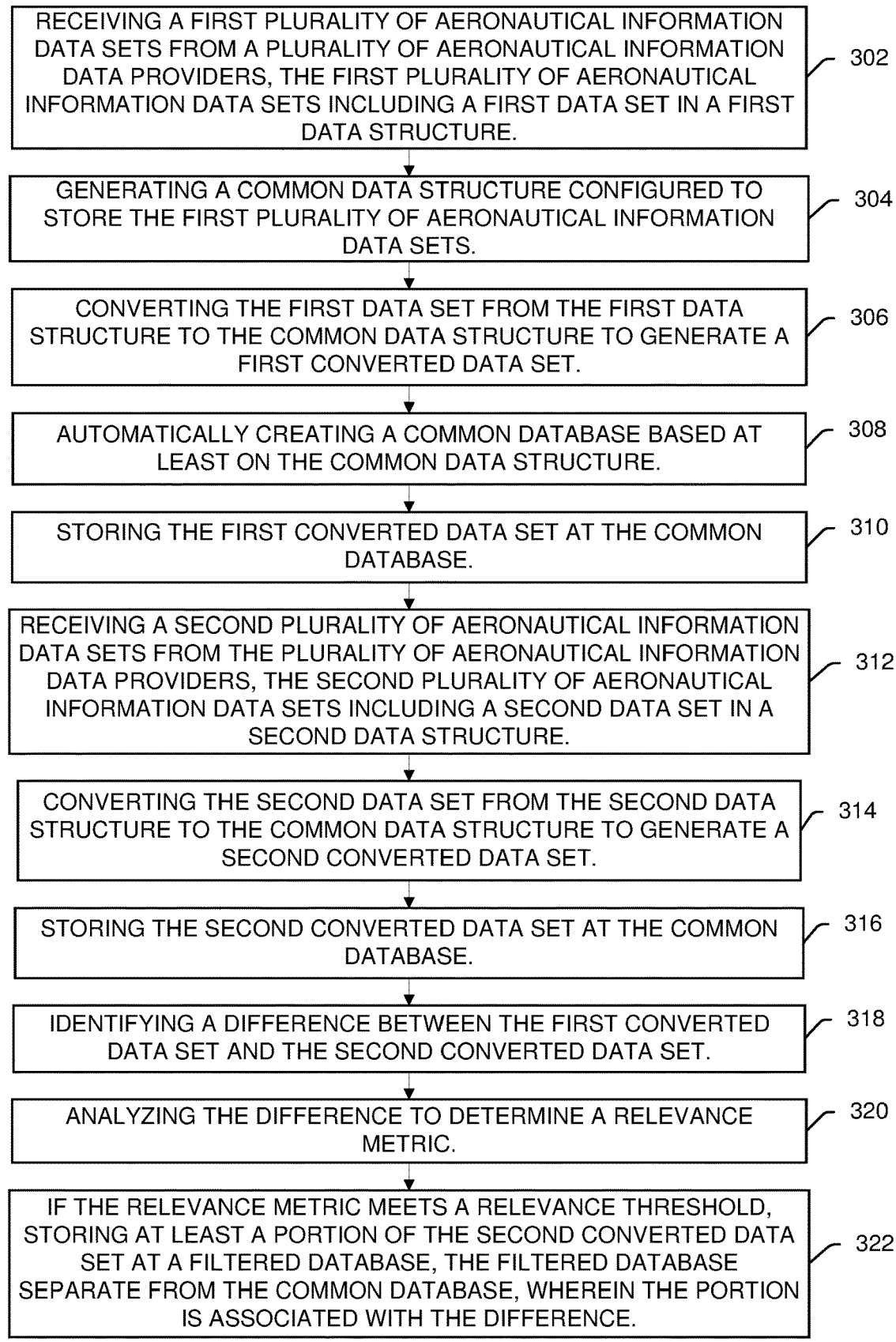
FIG. 3 is a flow chart of an example method for providing an automated environment for aeronautical information services, in accordance with the subject disclosure.

FIG. 3 is a flow chart of an example method 300 for providing an automated environment for aeronautical information services, in accordance with the subject disclosure. The method 300 can be initiated, performed, or controlled by one or more processors executing instructions, such as by the processor(s) 106 of FIG. 1 executing instructions from the memory 108.

In some implementations, the method 300 includes, at 302, receiving a first plurality of aeronautical information data sets from a plurality of aeronautical information data providers, the first plurality of aeronautical information data sets including a first data set in a first data structure. For example, the processor (s) 106 of FIG. 1 can receive the first plurality of aeronautical information data sets 114 from the plurality of aeronautical information data providers 104.

In the example of FIG. 3, the method 300 also includes, at 304, generating a common data structure configured to store the first plurality of aeronautical information datasets. For example, the processor(s) 106 of FIG. 1 can generate the common data structure 118 configured to store the first plurality of aeronautical information data sets 114.

In the example of FIG. 3, the method 300 also includes, at 306, converting the first data set from the first data structure to the common data structure to generate a first converted data set. For example, the processor(s) 106 of FIG. 1 can convert the first data set 116 to the common data structure 118 to generate a first converted data set 124.

In the example of FIG. 3, the method 300 also includes, at 308, automatically creating a common database based at least on the common data structure. For example, the processor(s) 106 of FIG. 1 can be configured to automatically create the common database 134 based at least on the common data structure 118.

In the example of FIG. 3, the method 300 also includes, at 310, storing the first converted data set at the common database. For example, the processor(s) 106 of FIG. 1 can store the first converted data set 124 at the common database 134.

In the example of FIG. 3, the method 300 also includes, at 312, receiving a second plurality of aeronautical information datasets from the plurality of aeronautical information data providers, the second plurality of aeronautical information data sets including a second data set in a second data structure. For example, the processor(s) 106 of FIG. 1 can receive the second plurality of aeronautical information data sets 126 from the plurality of aeronautical information data providers 104, the second plurality of aeronautical information data sets 126 including a second data set 128 in a second data structure.

In the example of FIG. 3, the method 300 also includes, at 314, converting the second data set from the second data structure to the common data structure to generate a second converted data set. For example, the processor(s) 106 of FIG. 1 can convert the second data set 128 from the second data structure to the common data structure 118 to generate a second converted data set 130.

In the example of FIG. 3, the method 300 also includes, at 316, storing the second converted data set at the common database. For example, the processor(s) 106 of FIG. 1 can store the second converted data set 130 at the common database 134.

In the example of FIG. 3, the method 300 also includes, at 318, identifying a difference between the first converted data set and the second converted data set. For example, the processor(s) 106 of FIG. 1 can identify a difference between the first converted data set 124 and the second converted data set 130.

In the example of FIG. 3, the method 300 also includes, at 320, analyzing the difference to determine a relevance metric. For example, the processor(s) 106 of FIG. 1 can analyze the difference to determine a relevance metric 136.

In the example of FIG. 3, the method 300 also includes, at 322, if the relevance metric meets a relevance threshold, storing at least a portion of the second converted data set at a filtered database, the filtered database separate from the common database, wherein the portion is associated with the difference. For example, the processor(s) 106 of FIG. 1 can, if the relevance metric 136 meets a relevance threshold 142, store at least a portion of the second converted data set 130 at the filtered database 138, the filtered database 138 separate from the common database 134, wherein the portion is associated with the difference.

Although the method 300 is illustrated as including a certain number of steps, more, fewer, and/or different steps can be included in the method 300 without departing from the scope of the subject disclosure. For example, the method 300 can vary depending on the count and variety of data requirements available for processing, as described in more detail above with reference to FIGS. 1-2. For example, the method 300 can store the first converted data set at the common database prior to, simultaneously with, or after converting the second data set from the second data structure to the common data structure to generate a second converted data set.

Figure 4:
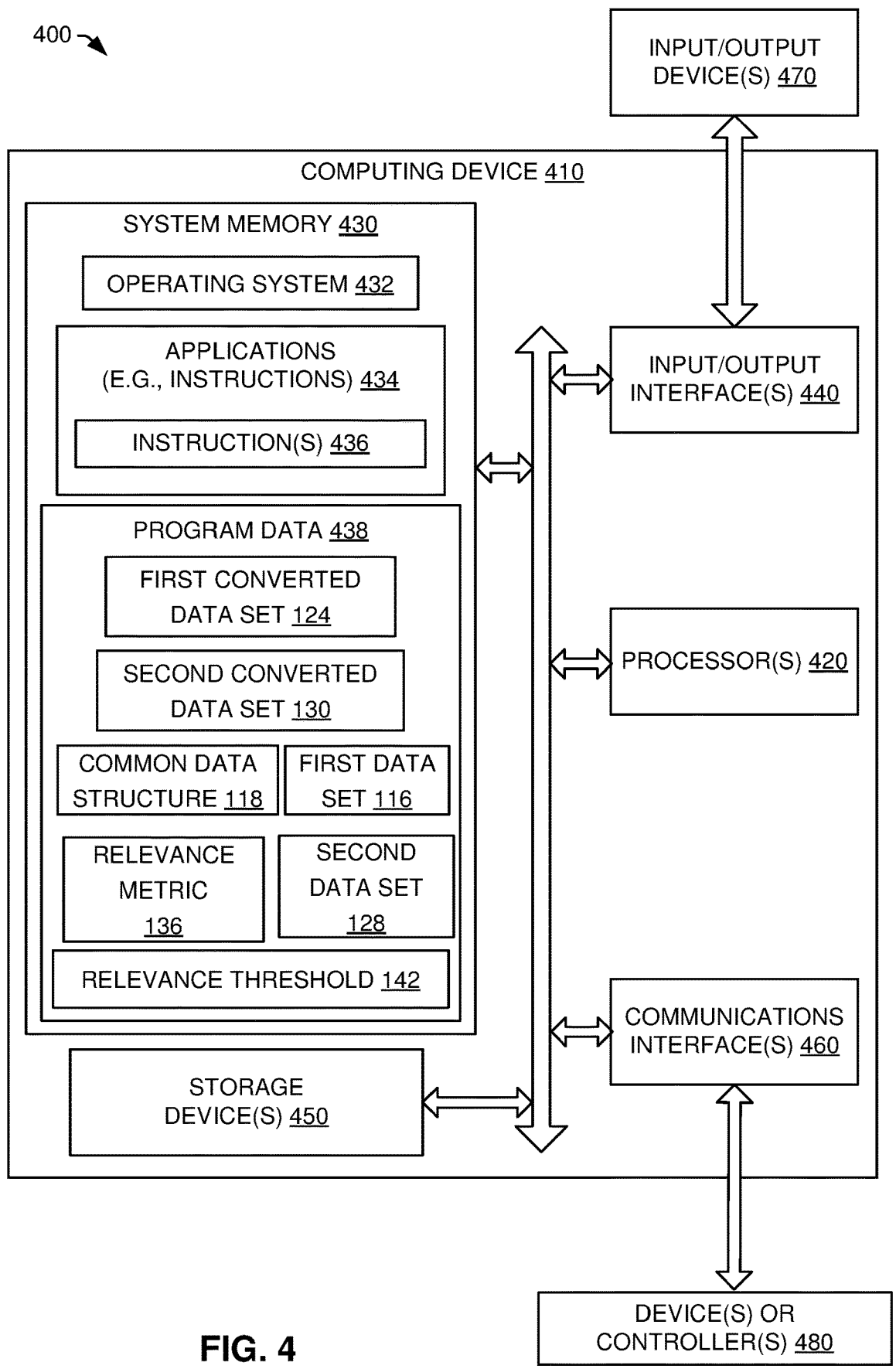
FIG. 4 is a block diagram of a computing environment including a computing device configured to support aspects of computer-implemented methods and computer-executable program instructions (or code) according to the subject disclosure.

FIG. 4 is a block diagram of a computing environment 400 including a computing device 410 configured to support aspects of computer-implemented methods and computer-executable program instructions (or code) according to the subject disclosure. For example, the computing device 410, or portions thereof, is configured to execute instructions to initiate, perform, or control one or more operations described in more detail above with reference to FIGS. 1-3. In a particular aspect, the computing device 410 can include the computing device 102, the common database 134, and/or the filtered database 138 of FIG. 1; the source data to reporting cycle mapping module 210 and/or one or more components of the user interface suite 220 of FIG. 2; one or more servers; one or more virtual devices; or a combination thereof.

The computing device 410 includes one or more processors 420. In a particular aspect, the processor(s) 420 correspond to the processor(s) 106 of FIG. 1. The processor(s) 420 are configured to communicate with system memory 430, one or more storage devices 450, one or more input/output interfaces 440, one or more communications interfaces 460, or any combination thereof. The system memory 430 includes volatile memory devices (e.g., random access memory (RAM) devices), nonvolatile memory devices (e.g., read-only memory (ROM) devices, programmable read-only memory, and flash memory), or both. The system memory 430 stores an operating system 432, which can include a basic input/output system for booting the computing device 410 as well as a full operating system to enable the computing device 410 to interact with users, other programs, and other devices. The system memory 430 stores system (program) data 438, such as the instructions 436, the first converted data set 124, the second converted data set 130, the common data structure 118, the first data set 116, the second data set 128, the relevance metric 136, the relevance threshold 142 of FIG. 1, or a combination thereof.

The system memory 430 includes one or more applications 434 (e.g., sets of instructions) executable by the processor(s) 420. As an example, the one or more applications 434 include the instructions 436 executable by the processor(s) 420 to initiate, control, or perform one or more operations described with reference to FIGS. 1-3. To illustrate, the one or more applications 434 include the instructions 436 executable by the processor(s) 420 to initiate, control, or perform one or more operations described with reference to automatically creating the common database 134 based at least on the common data structure 118, identifying a difference between the first converted data set 124 and the second converted data set 130, or a combination thereof.

In a particular implementation, the system memory 430 includes a non-transitory, computer readable medium (e.g., a computer-readable storage device) storing the instructions 436 that, when executed by the processor(s) 420, cause the processor(s) 420 to initiate, perform, or control operations for improving an automated environment for aeronautical information services. The operations include receiving a first plurality of aeronautical information data sets from a plurality of aeronautical information data providers, generating a common data structure configured to store the first plurality of aeronautical information data sets. The operations also include converting the first data set from the first data structure to the common data structure to generate a first converted data set. The operations also include automatically creating a common database based at least on the common data structure. The operations also include storing the first converted data set at the common database. The operations also include receiving a second plurality of aeronautical information data sets from the plurality of aeronautical information data providers. The operations also include converting the second data set from the second data structure to the common data structure to generate a second converted data set. The operations also include storing the second converted data set at the common database. The operations also include identifying a difference between the first converted data set and the second converted data set. The operations also include analyzing the difference to determine a relevance metric. The operations also include, if the relevance metric meets a relevance threshold, storing at least a portion of the second converted data set at a filtered database, the filtered database separate from the common database, wherein the portion is associated with the difference.

The one or more storage devices 450 include nonvolatile storage devices, such as magnetic disks, optical disks, or flash memory devices. In a particular example, the storage devices 450 include both removable and non-removable memory devices. The storage devices 450 are configured to store an operating system, images of operating systems, applications (e.g., one or more of the applications 434), and program data (e.g., the program data 438). In a particular aspect, the system memory 430, the storage devices 450, or both, include tangible computer-readable media. In a particular aspect, one or more of the storage devices 450 are external to the computing device 410.

The one or more input/output interfaces 440 enable the computing device 410 to communicate with one or more input/output devices 470 to facilitate user interaction. For example, the one or more input/output interfaces 440 can include a display interface, an input interface, or both. For example, the input/output interface 440 is adapted to receive input from a user, to receive input from another computing device, or a combination thereof. In some implementations, the input/output interface 440 conforms to one or more standard interface protocols, including serial interfaces (e.g., universal serial bus (USB) interfaces or Institute of Electrical and Electronics Engineers (IEEE) interface standards), parallel interfaces, display adapters, audio adapters, or custom interfaces ("IEEE" is a registered trademark of The Institute of Electrical and Electronics Engineers, Inc. of Piscataway, New Jersey). In some implementations, the input/output device(s) 470 include one or more user interface devices and displays, including some combination of buttons, keyboards, pointing devices, displays, speakers, microphones, touch screens, and other devices.

The processor(s) 420 are configured to communicate with devices or controllers 480 via the one or more communications interfaces 460. For example, the one or more communications interfaces 460 can include a network interface. The devices or controllers 480 can include, for example, the common database 134 and/or the filtered database 138 of FIG. 1.

In some implementations, a non-transitory, computer readable medium (e.g., a computer-readable storage device) stores instructions that, when executed by one or more processors, cause the one or more processors to initiate, perform, or control operations to perform part of or all the functionality described above. For example, the instructions can be executable to implement one or more of the operations or methods of FIGS. 1-3. In some implementations, part or all of one or more of the operations or methods of FIGS. 1-3 can be implemented by one or more processors (e.g., one or more central processing units (CPUs), one or more graphics processing units (GPUs), one or more digital signal processors (DSPs)) executing instructions, by dedicated hardware circuitry, or any combination thereof.

The illustrations of the examples described herein are intended to provide a general understanding of the structure of the various implementations. The illustrations are not intended to serve as a complete description of all of the elements and features of apparatus and systems that utilize the structures or methods described herein. Many other implementations can be apparent to those of skill in the art upon reviewing the disclosure. Other implementations can be utilized and derived from the disclosure, such that structural and logical substitutions and changes can be made without departing from the scope of the disclosure. For example, method operations can be performed in a different order than shown in the figures or one or more method operations can be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results can be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features can be grouped together or described in a single implementation for the purpose of streamlining the disclosure. Examples described above illustrate but do not limit the disclosure. It should also be understood that numerous modifications and variations are possible in accordance with the principles of the subject disclosure. As the following claims reflect, the claimed subject matter can be directed to less than all of the features of any of the disclosed examples. Accordingly, the scope of the disclosure is defined by the following claims and their equivalents.

Further, the disclosure comprises embodiments according to the following clauses:

According to Clause 1, a method includes receiving a first plurality of aeronautical information data sets from a plurality of aeronautical information data providers, the first plurality of aeronautical information data sets including a first data set in a first data structure. The method also includes generating a common data structure configured to store the first plurality of aeronautical information data sets. The method also includes converting the first data set from the first data structure to the common data structure to generate a first converted data set. The method also includes automatically creating a common database based at least on the common data structure. The method also includes storing the first converted data set at the common database. The method also includes receiving a second plurality of aeronautical information data sets from the plurality of aeronautical information data providers, the second plurality of aeronautical information data sets including a second data set in a second data structure. The method also includes converting the second data set from the second data structure to the common data structure to generate a second converted data set. The method also includes storing the second converted data set at the common database. The method also includes identifying a difference between the first converted data set and the second converted data set. The method also includes analyzing the difference to determine a relevance metric. The method also includes, if the relevance metric meets a relevance threshold, storing at least a portion of the second converted data set at a filtered database, the filtered database separate from the common database, wherein the portion is associated with the difference.

Clause 2 includes the method of Clause 1, wherein the first data set includes navigation data.

Clause 3 includes the method of Clause 2, wherein the navigation data includes runway closure information, airport identification information, runway identification information, terminal identification information, procedural information, holding pattern information, or airway information.

Clause 4 includes the method of any of Clauses 1-3, wherein the first data structure and the second data structure are the same.

Clause 5 includes the method of any of Clauses 1-3, wherein the first data structure and the second data structure are different.

Clause 6 includes the method of any of Clauses 1-5, wherein the first data structure is associated with data from a first aeronautical information data provider of the plurality of aeronautical information data providers and the second data structure is associated with data from a second aeronautical information data provider of the plurality of aeronautical information data providers.

Clause 7 includes the method of any of Clauses 1-6, wherein the first data structure is associated with a first implementation of an Aeronautical Information Exchange Model ("AIXM") and the second data structure is associated with a second implementation of the AIXM.

Clause 8 includes the method of any of Clauses 1-7, wherein the first data structure includes an Extensible Markup Language ("XML") schema.

Clause 9 includes the method of any of Clauses 1-8, wherein the second data structure includes an XML schema.

Clause 10 includes the method of any of Clauses 1-9, wherein: the first data structure includes a first XML schema; the second data structure includes a second XML schema; and wherein the first XML schema is different from the second XML schema.

Clause 11 includes the method of any of Clauses 1-10, wherein the method further includes converting the first converted data set from the common data structure to the first data structure to generate a first reverse data set. The method also includes automatically performing a comparison of the first reverse data set with the first data set. The method also includes generating a conversion error notification if the comparison indicates a discrepancy between the first data set and the first reverse data set.

Clause 12 includes the method of any of Clauses 1-11, wherein: the first data set is for a first time period; the second data set is for a second time period; and wherein the first time period is different from the second time period.

Clause 13 includes the method of Clause 12, wherein converting the first data set includes mapping the first data set to the second time period.

According to Clause 14, a non-transient, computer-readable medium stores instructions that, when executed by one or more processors, cause the one or more processors to initiate, perform, or control operations that include receiving a first plurality of aeronautical information data sets from a plurality of aeronautical information data providers, the first plurality of aeronautical information data sets including a first data set in a first data structure. The operations also include generating a common data structure configured to store the first plurality of aeronautical information data sets. The operations also include converting the first data set from the first data structure to the common data structure to generate a first converted data set. The operations also include automatically creating a common database based at least on the common data structure. The operations also include storing the first converted data set at the common database. The operations also include receiving a second plurality of aeronautical information data sets from the plurality of aeronautical information data providers, the second plurality of aeronautical information data sets including a second data set in a second data structure. The operations also include converting the second data set from the second data structure to the common data structure to generate a second converted data set. The operations also include storing the second converted data set at the common database. The operations also include identifying a difference between the first converted data set and the second converted data set. The operations also include analyzing the difference to determine a relevance metric. The operations also include, if the relevance metric meets a relevance threshold, storing at least a portion of the second converted data set at a filtered database, the filtered database separate from the common database, wherein the portion is associated with the difference.

Clause 15 includes the non-transient, computer-readable medium of Clause 14, wherein the first data set includes navigation data.

Clause 16 includes the non-transient, computer-readable medium of Clause 15, wherein the navigation data includes runway closure information, airport identification information, runway identification information, terminal identification information, procedural information, holding pattern information, or airway information.

Clause 17 includes the non-transient, computer-readable medium of any of Clauses 14-16, wherein the first data structure and the second data structure are the same.

Clause 18 includes the non-transient, computer-readable medium of any of Clauses 14-16, wherein the first data structure and the second data structure are different.

Clause 19 includes the non-transient, computer-readable medium of any of Clauses 14-18, wherein the first data structure is associated with data from a first aeronautical information data provider of the plurality of aeronautical information data providers and the second data structure is associated with data from a second aeronautical information data provider of the plurality of aeronautical information data providers.

Clause 20 includes the non-transient, computer-readable medium of any of Clauses 14-19, wherein the first data structure is associated with a first implementation of an Aeronautical Information Exchange Model ("AIXM") and the second data structure is associated with a second implementation of the AIXM.

Clause 21 includes the non-transient, computer-readable medium of any of Clauses 14-20, wherein the first data structure includes an Extensible Markup Language ("XML") schema.

Clause 22 includes the non-transient, computer-readable medium of any of Clauses 14-21, wherein the second data structure includes an XML schema.

Clause 23 includes the non-transient, computer-readable medium of any of Clauses 14-22, wherein: the first data structure includes a first XML schema; the second data structure includes a second XML schema; and wherein the first XML schema is different from the second XML schema.

Clause 24 includes the non-transient, computer-readable medium of any of Clauses 14-23, wherein the operations further include converting the first converted data set from the common data structure to the first data structure to generate a first reverse data set. The operations also include automatically performing a comparison of the first reverse data set with the first data set. The operations also include generating a conversion error notification if the comparison indicates a discrepancy between the first data set and the first reverse data set.

Clause 25 includes the non-transient, computer-readable medium of any of Clauses 14-24, wherein: the first data set is for a first time period; the second data set is for a second time period; and wherein the first time period is different from the second time period.

Clause 26 includes the non-transient, computer-readable medium of Clause 25, wherein converting the first data set includes mapping the first data set to the second time period.

According to Clause 27, a device includes means for receiving a first plurality of aeronautical information data sets from a plurality of aeronautical information data providers, the first plurality of aeronautical information data sets including a first data set in a first data structure. The device also includes means for generating a common data structure configured to store the first plurality of aeronautical information data sets. The device also includes means for converting the first data set from the first data structure to the common data structure to generate a first converted data set. The device also includes means for automatically creating a common database based at least on the common data structure. The device also includes means for storing the first converted data set at the common database. The device also includes means for receiving a second plurality of aeronautical information data sets from the plurality of aeronautical information data providers, the second plurality of aeronautical information data sets including a second data set in a second data structure. The device also includes means for converting the second data set from the second data structure to the common data structure to generate a second converted data set. The device also includes means for storing the second converted data set at the common database. The device also includes means for identifying a difference between the first converted data set and the second converted data set. The device also includes means for analyzing the difference to determine a relevance metric, The device also includes means for storing at least a portion of the second converted data set at a filtered database if the relevance metric meets a relevance threshold, the filtered database separate from the common database, wherein the portion is associated with the difference.

Clause 28 includes the device of Clause 27, wherein the first data set includes navigation data.

Clause 29 includes the device of Clause 28, wherein the navigation data includes runway closure information, airport identification information, runway identification information, terminal identification information, procedural information, holding pattern information, or airway information.

Clause 30 includes the device of any of Clauses 27-29, wherein the first data structure and the second data structure are the same.

Clause 31 includes the device of any of Clauses 27-29, wherein the first data structure and the second data structure are different.

Clause 32 includes the device of any of Clauses 27-31, wherein the first data structure is associated with data from a first aeronautical information data provider of the plurality of aeronautical information data providers and the second data structure is associated with data from a second aeronautical information data provider of the plurality of aeronautical information data providers.

Clause 33 includes the device of any of Clauses 27-32, wherein the first data structure is associated with a first implementation of an Aeronautical Information Exchange Model ("AIXM") and the second data structure is associated with a second implementation of the AIXM.

Clause 34 includes the device of any of Clauses 27-33, wherein the first data structure includes an Extensible Markup Language ("XML") schema.

Clause 35 includes the device of any of Clauses 27-34, wherein the second data structure includes an XML schema.

Clause 36 includes the device of any of Clauses 27-35, wherein: the first data structure includes a first XML schema; the second data structure includes a second XML schema; and wherein the first XML schema is different from the second XML schema.

Clause 37 includes the device of any of Clauses 27-36, wherein the device also includes means for converting the first converted data set from the common data structure to the first data structure to generate a first reverse data set. The device also includes means for automatically performing a comparison of the first reverse data set with the first data set. The device also includes means for generating a conversion error notification if the comparison indicates a discrepancy between the first data set and the first reverse data set.

Clause 38 includes the device of any of Clauses 27-37, wherein: the first data set is for a first time period; the second data set is for a second time period; and wherein the first time period is different from the second time period.

Clause 39 includes the device of Clause 38, wherein converting the first data set includes mapping the first data set to the second time period.

According to Clause 40, a system includes a memory configured to store instructions. The system also includes one or more processors coupled to the memory and configured to receive a first plurality of aeronautical information data sets from a plurality of aeronautical information data providers, the first plurality of aeronautical information data sets including a first data set in a first data structure. The one or more processors are also configured to generate a common data structure configured to store the first plurality of aeronautical information data sets. The one or more processors are also configured to convert the first data set from the first data structure to the common data structure to generate a first converted data set. The one or more processors are also configured to automatically create a common database based at least on the common data structure. The one or more processors are also configured to store the first converted data set at the common database. The one or more processors are also configured to receive a second plurality of aeronautical information data sets from the plurality of aeronautical information data providers, the second plurality of aeronautical information data sets including a second data set in a second data structure. The one or more processors are also configured to convert the second data set from the second data structure to the common data structure to generate a second converted data set, The one or more processors are also configured to store the second converted data set at the common database. The one or more processors are also configured to identify a difference between the first converted data set and the second converted data set. The one or more processors are also configured to analyze the difference to determine a relevance metric. The one or more processors are also configured to, if the relevance metric meets a relevance threshold, store at least a portion of the second converted data set at a filtered database, the filtered database separate from the common database, wherein the portion is associated with the difference.

Clause 41 includes the system of Clause 40, wherein the first data set includes navigation data.

Clause 42 includes the system of Clause 41, wherein the navigation data includes runway closure information, airport identification information, runway identification information, terminal identification information, procedural information, holding pattern information, or airway information.

Clause 43 includes the system of any of Clauses 40-42, wherein the first data structure and the second data structure are the same.

Clause 44 includes the system of any of Clauses 40-42, wherein the first data structure and the second data structure are different.

Clause 45 includes the system of any of Clauses 40-44, wherein the first data structure is associated with data from a first aeronautical information data provider of the plurality of aeronautical information data providers and the second data structure is associated with data from a second aeronautical information data provider of the plurality of aeronautical information data providers.

Clause 46 includes the system of any of Clauses 40-45, wherein the first data structure is associated with a first implementation of an Aeronautical Information Exchange Model ("AIXM") and the second data structure is associated with a second implementation of the AIXM.

Clause 47 includes the system of any of Clauses 40-46, wherein the first data structure includes an Extensible Markup Language ("XML") schema.

Clause 48 includes the system of any of Clauses 40-47, wherein the second data structure includes an XML schema.

Clause 49 includes the system of any of Clauses 40-48, wherein: the first data structure includes a first XML schema; the second data structure includes a second XML schema; and wherein the first XML schema is different from the second XML schema.

Clause 50 includes the system of any of Clauses 40-49, wherein the one or more processors are further configured to convert the first converted data set from the common data structure to the first data structure to generate a first reverse data set. The one or more processors are also configured to automatically perform a comparison of the first reverse data set with the first data set. The one or more processors are also configured to generate a conversion error notification if the comparison indicates a discrepancy between the first data set and the first reverse data set.

Clause 51 includes the system of any of Clauses 40-50, wherein: the first data set is for a first time period; the second data set is for a second time period; and wherein the first time period is different from the second time period.

Clause 52 includes the system of Clause 51, wherein the one or more processors are configured to convert the first data set by mapping the first data set to the second time period.

What is claimed is:

1. A method comprising:
receiving a first plurality of aeronautical information data sets from a plurality of aeronautical information data providers, the first plurality of aeronautical information data sets including a first data set in a first data structure;
generating a common data structure configured to store the first plurality of aeronautical information data sets;
converting the first data set from the first data structure to the common data structure to generate a first converted data set;
automatically creating a common database based at least on the common data structure;
storing the first converted data set at the common database;
receiving a second plurality of aeronautical information data sets from the plurality of aeronautical information data providers, the second plurality of aeronautical information data sets including a second data set in a second data structure;
converting the second data set from the second data structure to the common data structure to generate a second converted data set;
storing the second converted data set at the common database;
identifying a difference between the first converted data set and the second converted data set;
analyzing the difference to determine a relevance metric; and
if the relevance metric meets a relevance threshold, storing at least a portion of the second converted data set at a filtered database, the filtered database separate from the common database, wherein the portion is associated with the difference.

2. The method of claim 1, wherein the first data set comprises navigation data.

3. The method of claim 2, wherein the navigation data comprises runway closure information, airport identification information, runway identification information, terminal identification information, procedural information, holding pattern information, or airway information.

4. The method of claim 1, wherein the first data structure and the second data structure are the same.

5. The method of claim 1, wherein the first data structure and the second data structure are different.

6. The method of claim 1, wherein the first data structure is associated with data from a first aeronautical information data provider of the plurality of aeronautical information data providers and the second data structure is associated with data from a second aeronautical information data provider of the plurality of aeronautical information data providers.

7. The method of claim 1, wherein the first data structure is associated with a first implementation of an Aeronautical Information Exchange Model ("AIXM") and the second data structure is associated with a second implementation of the AIXM.

8. The method of claim 1, wherein the first data structure comprises an Extensible Markup Language ("XML") schema.

9. The method of claim 1, wherein the second data structure comprises an XML schema.

10. The method of claim 1, wherein:
the first data structure comprises a first XML schema;
the second data structure comprises a second XML schema; and
wherein the first XML schema is different from the second XML schema.

11. The method of claim 1, further comprising:
converting the first converted data set from the common data structure to the first data structure to generate a first reverse data set;
automatically performing a comparison of the first reverse data set with the first data set; and
generating a conversion error notification if the comparison indicates a discrepancy between the first data set and the first reverse data set.

12. The method of claim 1, wherein:
the first data set is for a first time period;
the second data set is for a second time period; and wherein the first time period is different from the second time period.

13. The method of claim 12, wherein converting the first data set comprises mapping the first data set to the second time period.

14. A non-transient, computer-readable medium storing instructions that, when executed by one or more processors, cause the one or more processors to initiate, perform, or control operations including:
receiving a first plurality of aeronautical information data sets from a plurality of aeronautical information data providers, the first plurality of aeronautical information data sets including a first data set in a first data structure;
generating a common data structure configured to store the first plurality of aeronautical information data sets;
converting the first data set from the first data structure to the common data structure to generate a first converted data set;
automatically creating a common database based at least on the common data structure;
storing the first converted data set at the common database;
receiving a second plurality of aeronautical information data sets from the plurality of aeronautical information data providers, the second plurality of aeronautical information data sets including a second data set in a second data structure;
converting the second data set from the second data structure to the common data structure to generate a second converted data set;
storing the second converted data set at the common database;
identifying a difference between the first converted data set and the second converted data set;
analyzing the difference to determine a relevance metric; and
if the relevance metric meets a relevance threshold, storing at least a portion of the second converted data set at a filtered database, the filtered database separate from the common database, wherein the portion is associated with the difference.

15. The non-transient, computer-readable medium of claim 14, wherein the operations further include:
converting the first converted data set from the common data structure to the first data structure to generate a first reverse data set;
automatically performing a comparison of the first reverse data set with the first data set; and
generating a conversion error notification if the comparison indicates a discrepancy between the first data set and the first reverse data set.

16. The non-transient, computer-readable medium of claim 14, wherein the first data set comprises navigation data.

17. The non-transient, computer-readable medium of claim 16, wherein the navigation data comprises runway closure information, airport identification information, runway identification information, terminal identification information, procedural information, holding pattern information, or airway information.

18. A system comprising:
a memory configured to store instructions; and
one or more processors coupled to the memory and configured to:
receive a first plurality of aeronautical information data sets from a plurality of aeronautical information data providers, the first plurality of aeronautical information data sets including a first data set in a first data structure;
generate a common data structure configured to store the first plurality of aeronautical information data sets;
convert the first data set from the first data structure to the common data structure to generate a first converted data set;
automatically create a common database based at least on the common data structure;
store the first converted data set at the common database;
receive a second plurality of aeronautical information data sets from the plurality of aeronautical information data providers, the second plurality of aeronautical information data sets including a second data set in a second data structure;
convert the second data set from the second data structure to the common data structure to generate a second converted data set;
store the second converted data set at the common database;
identify a difference between the first converted data set and the second converted data set;
analyze the difference to determine a relevance metric; and
if the relevance metric meets a relevance threshold, store at least a portion of the second converted data set at a filtered database, the filtered database separate from the common database, wherein the portion is associated with the difference.

19. The system of claim 18, wherein the first data set comprises navigation data.

20. The system of claim 19, wherein the navigation data comprises runway closure information, airport identification information, runway identification information, terminal identification information, procedural information, holding pattern information, or airway information.

* * * * *